United States Patent
Guenther et al.

(10) Patent No.: US 7,336,209 B2
(45) Date of Patent: Feb. 26, 2008

(54) METHOD AND DEVICE FOR DATA TRANSMISSION

(75) Inventors: Uwe Guenther, Nufringen (DE);
Manfred Kirschner, Stuttgart (DE);
Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/519,600

(22) PCT Filed: Jun. 20, 2003

(86) PCT No.: PCT/DE03/02070

§ 371 (c)(1),
(2), (4) Date: Sep. 16, 2005

(87) PCT Pub. No.: WO2004/004261

PCT Pub. Date: Jan. 8, 2004

(65) Prior Publication Data

US 2006/0082477 A1    Apr. 20, 2006

(30) Foreign Application Priority Data

Jun. 27, 2002    (DE)    ................................. 102 28 905

(51) Int. Cl.
*H03M 9/00*    (2006.01)
(52) U.S. Cl. .................... 341/100; 341/101; 710/71
(58) Field of Classification Search ................ 341/100, 341/101; 710/71
See application file for complete search history.

(56) References Cited

U.S. PATENT DOCUMENTS

| 4,409,587 | A | | 10/1983 | Scott | |
|---|---|---|---|---|---|
| 4,532,557 | A | | 7/1985 | Larkins | |
| 5,203,945 | A | * | 4/1993 | Hasegawa et al. | 156/345.28 |
| 5,475,831 | A | * | 12/1995 | Yoshida et al. | 710/71 |
| 5,475,854 | A | * | 12/1995 | Thomsen et al. | 710/23 |
| 2001/0044862 | A1 | * | 11/2001 | Mergard et al. | 710/71 |

FOREIGN PATENT DOCUMENTS

| DE | 34 45 617 | | 7/1985 |
|---|---|---|---|
| DE | 44 07 948 | | 9/1995 |
| EP | 0 245 616 | | 11/1987 |
| EP | 0 404 986 | | 1/1991 |
| EP | 0 521 677 | | 1/1993 |
| JP | 11178349 A | * | 7/1999 |
| WO | WO 9845787 A1 | * | 10/1998 |

OTHER PUBLICATIONS

JPO Machine translation of drawing description section of JP 11-178349*
JPO Machine translation of drawing description section of JP 11-178349 date of Jul. 1999.*

* cited by examiner

*Primary Examiner*—Howard Williams
(74) *Attorney, Agent, or Firm*—Kenyon & Kenyon LLP

(57) ABSTRACT

A method for serially transmitting data between a first and a second station is provided, the first station unidirectionally transmitting at least two signals to the second station on two signal paths. In this method, a shift register is provided in each station, the two signal paths of the first station being routed in parallel into a shift register, and the data transmission to the second station being carried out by automatically clocking the shift register from a time base.

3 Claims, 4 Drawing Sheets

METHOD AND DEVICE FOR DATA TRANSMISSION

FIELD OF THE INVENTION

The present invention relates to a method and a device for serially transmitting data between a first and a second station.

BACKGROUND INFORMATION

Published German patent document DE 34 45 617 describes a method and an arrangement for serially transmitting the digital measured values of a measuring transducer. Included in it are shift registers, which perform a parallel-to-serial conversion in order to transmit the information. The shift registers are a discrete module or modules, which must be controlled by a logic circuit or control unit. That is, the processing unit itself or the CPU, e.g., that of the transmitting station, is loaded by the transmission. Therefore, in this known art, the processing unit or CPU controls the data transmission with an aid of a special clock-pulse train (cf. SPI interface or SCI interface, as well).

For serial interfaces, a bus protocol must be implemented or the transmission/receiving register must be operated by the CPU. In addition, information items, which only have a weak relationship to time, i.e., bring about problems regarding the real-time capability, are normally transmitted in the case of the mentioned, serial interfaces. Therefore, no fixed coupling of the CPU time base to the pin status occurs.

Therefore, it has been found that the known art is not capable of yielding optimum results in every respect. Thus, an object is to provide serial data transmission, where on one hand, the CPU is not loaded, and on the other hand, the real-time capability may nevertheless be ensured.

SUMMARY

This object is achieved by a method and a device for serially transmitting data between a first and a second station, the first station unidirectionally transmitting at least two signals to the second station on two signal paths, and a shift register being provided in each station, and the two signal paths of the first station being parallelly routed into a shift register, and the data transmission to the second station being carried out by automatically clocking the shift register from a time base.

That is, in the case of a station, e.g., a microcontroller, that has integrated these circuit elements, the present invention allows real-time signals to be transmitted without any CPU interaction. Examples of such real-time signals include, in this case, ignition, injection, and digital outputs of sensors, which transmit the information, e.g., via a pulse-width modulated signal, to the output-stage integrated circuit. The drivers, which are triggered by the CPU units on individual signal lines, are integrated on the receiving station, e.g., an output stage. In this respect, the integration of the circuit elements for the real-time processing on the second station, i.e., on, in particular, the output stage, causes problems, since these circuit elements become very large in a bipolar process for manufacturing and may be produced more cost-effectively on the controller in the system itself. In addition, a serial interface, via which, e.g., the diagnosis is read (SPI interface), is present from the first to the second station, in particular from the microcontroller to the output stages.

However, such an available interface as mentioned above does not usually satisfy real-time requirements and therefore raises problems of transmitting the information over the serial interface, and thus, of saving a number of pins, both at the computer and in the second station. Furthermore, though, the addition of timers in the second station for producing the real-time capability would sharply increase the system costs and render the system considerably more complex, in particular since the interface between the CPU and the output stage, i.e., between the first and second stations, has an additional latency.

A shift register, by which the serial interface, in particular the serial interface already present, may be controlled, is advantageously used in the present invention; the mentioned automatic clocking of the shift register from a time base, e.g., that of the first station, takes place in such a manner that the shift register receives a clock signal of the time base, and the shift register automatically transmits the data, using this clock signal. Therefore, in contrast to the known art, serial data transmission does not take place via a software trigger, but rather via a continuous hardware trigger on the mentioned basis of time, e.g., a timer module, which automatically generates a time signal at fixed intervals and therefore generates the clock pulse for the data transmission. Since a timer module already present may also be used for this, the addition of the shift register and the rerouting of the signal paths provide, without software expenditure and without loading the CPU, a simple option for transmitting a plurality of signals via an available serial interface, instead of in parallel, and for nevertheless satisfying the necessary real-time requirements.

The automatic clocking occurs at a clock-pulse rate which is at least twice as high as a signal rate that results from a resolution of a signal having the higher resolution between the at least two signals.

In a further example embodiment, the automatic timing and, therefore, the clock-pulse rate may be specified so that the cycle time resulting from the clock-pulse rate is less than or equal to a slope time of the signals to be transmitted. That is, in the case of a rising or falling edge of a signal, this change of level is always detected by the shift-register clock pulse within the framework of the serial data transmission.

In this context, the at least two signals each advantageously have a high signal level and a low signal level, the high signal level and the low signal level of the at least two signals being, in each instance, equal within specifiable tolerances. This is because the signals are transmitted to the shift register in parallel, and therefore, the high or low signal detection after the serial transmission is rendered possible in a simplified manner for each register cell.

DETAILED DESCRIPTION

Figure 1:
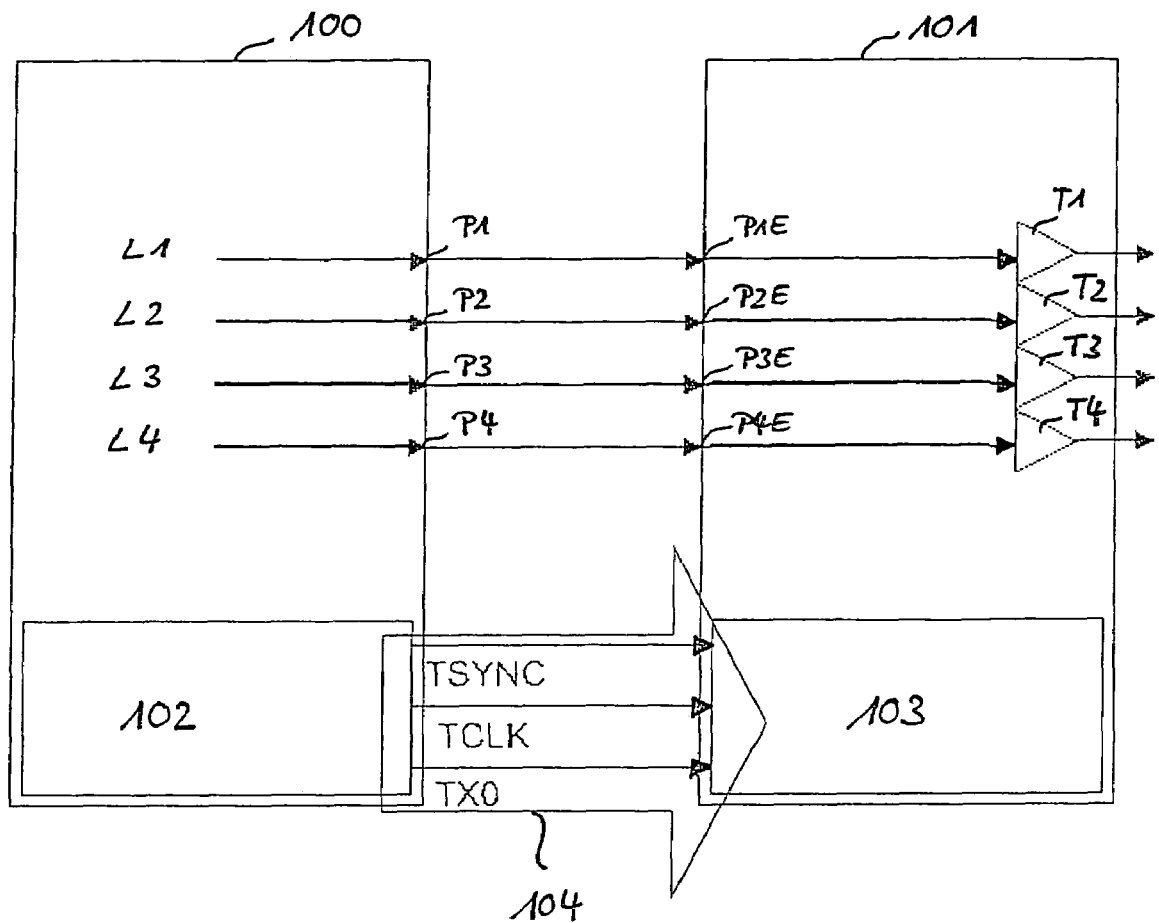
FIG. 1 shows a set-up having two stations and parallel signal paths for transmitting data.

FIG. 1 shows a first station 100 and a second station 101, e.g., a microcontroller 100 or a control unit, and an output stage 101. In FIG. 1, signals are transmitted to drivers T1 through T4 of output stage 101 via lines L1 through L4. Due to the parallel transmission, pins P1 through P4 are necessary in first station 100, and pins P1E through P4E are necessary in output stage 101. The signals transmitted to drivers T1 through T4 in the process are, as already mentioned above, e.g., real-time signals to be processed without CPU interaction, such as ignition, injection, and digital sensor outputs within the scope of an engine control unit. Simultaneously shown is a serial interface 104 from the microcontroller to output stages 101, along with a transmitting part 102 and a receiving part 103. The diagnosis, for example, may be read via the serial interface.

For the sake of clarity, only four transmission paths of signals L1 through L4 are shown here, including pins P1 through P4 and P1E through P4E and driver modules T1 through T4.

Of course, the present invention may equally be used for any number, in particular a larger number, of transmission paths (e.g. 20 to 30); the higher this number of transmission paths, and therefore the higher the number of pins, the greater the advantage, in particular the cost advantage, that results from this pin savings of the present invention.

The challenge is to transmit the information via a serial interface, from the point of view of real time, and therefore, on one hand, to eliminate the large number of pins P1 through P4 and P1E through P4E, and at the same time, to simultaneously reduce the workload of the CPU (central processing unit) of microcontroller 100.

Figure 2:
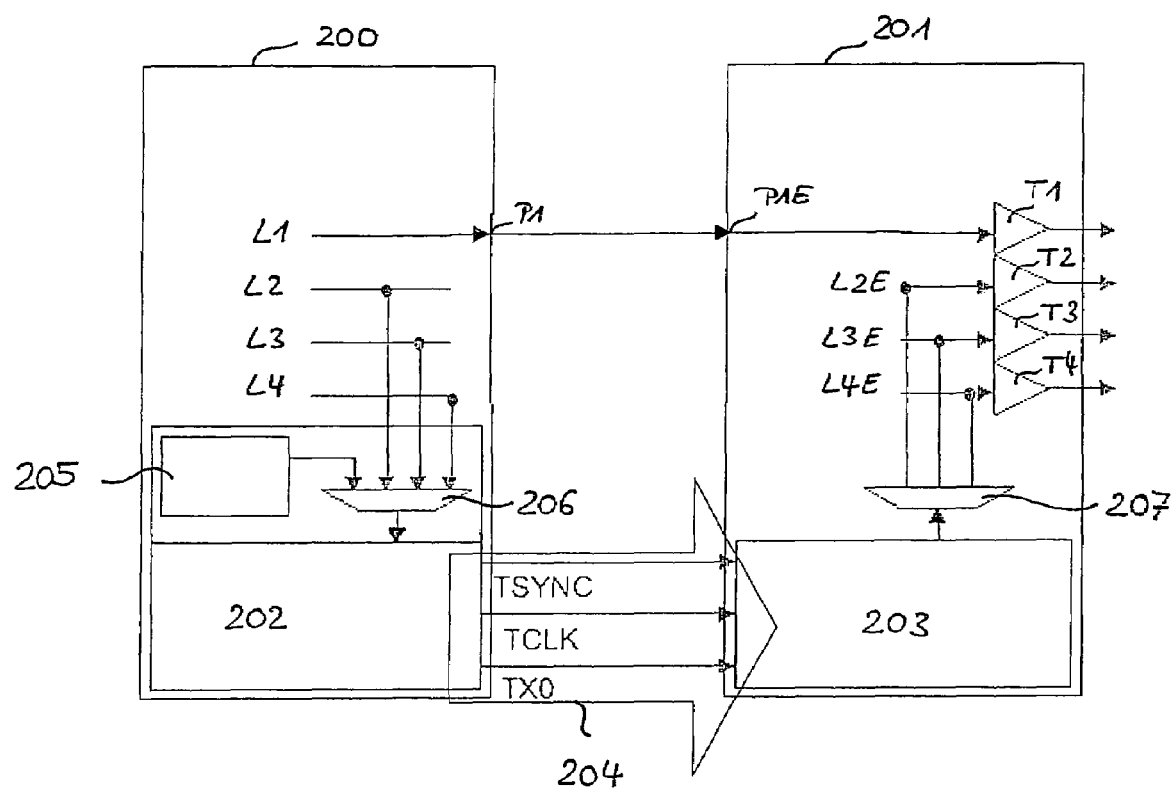
FIG. 2 shows serial data transmission using the shift register and the time base in accordance with the present invention.

This may be achieved according to the present invention, using FIG. 2. In this context, a serial shift register 206, which is triggered inside the microcontroller by the timer outputs, is used to carry out the parallel-to-serial conversion. In so doing, the frequency for the shift register is selected to be sufficiently high to allow a particular number of bits to be transmitted in a very short time, e.g., 16 bits in 1 μs. A parallel-to-serial conversion then takes place again in output stage 201, which means that output-stage transistors T1 through T4 in the output-stage type may be triggered by the converted signal. That is, the cycle time is the time that is necessary in order to transmit or shift all of the cells of the shift register once.

Therefore, in the mentioned example in FIG. 2, pins P2 through P4 and P2E through P4E are eliminated, where in principle, the present invention also allows pins P1 and P1E to be eliminated, by directing signal paths L2 through L4 to shift register 206. Furthermore, the time signals of time base 205, e.g., of a timer module, are transmitted to the shift register. Shift register 206 itself then has, in turn, a connection to transmitting module 202 of serial interface 204, via which the data content of the shift register is then serially transmitted to receiving module 203. This outputs these data to shift register 207 in output stage 201, from where they are transmitted to driver modules T2 through T4 via lines L2E, L3E, and L4E, i.e., virtually via the rerouted signal paths. In this context, serial interface 204, in the same way as interface 104 of FIG. 1, corresponds to a customary interface via which a synchronization signal TSYNC, a clock TCLK, and the actual signal are transmitted through transmission connection TXO.

Figure 3:
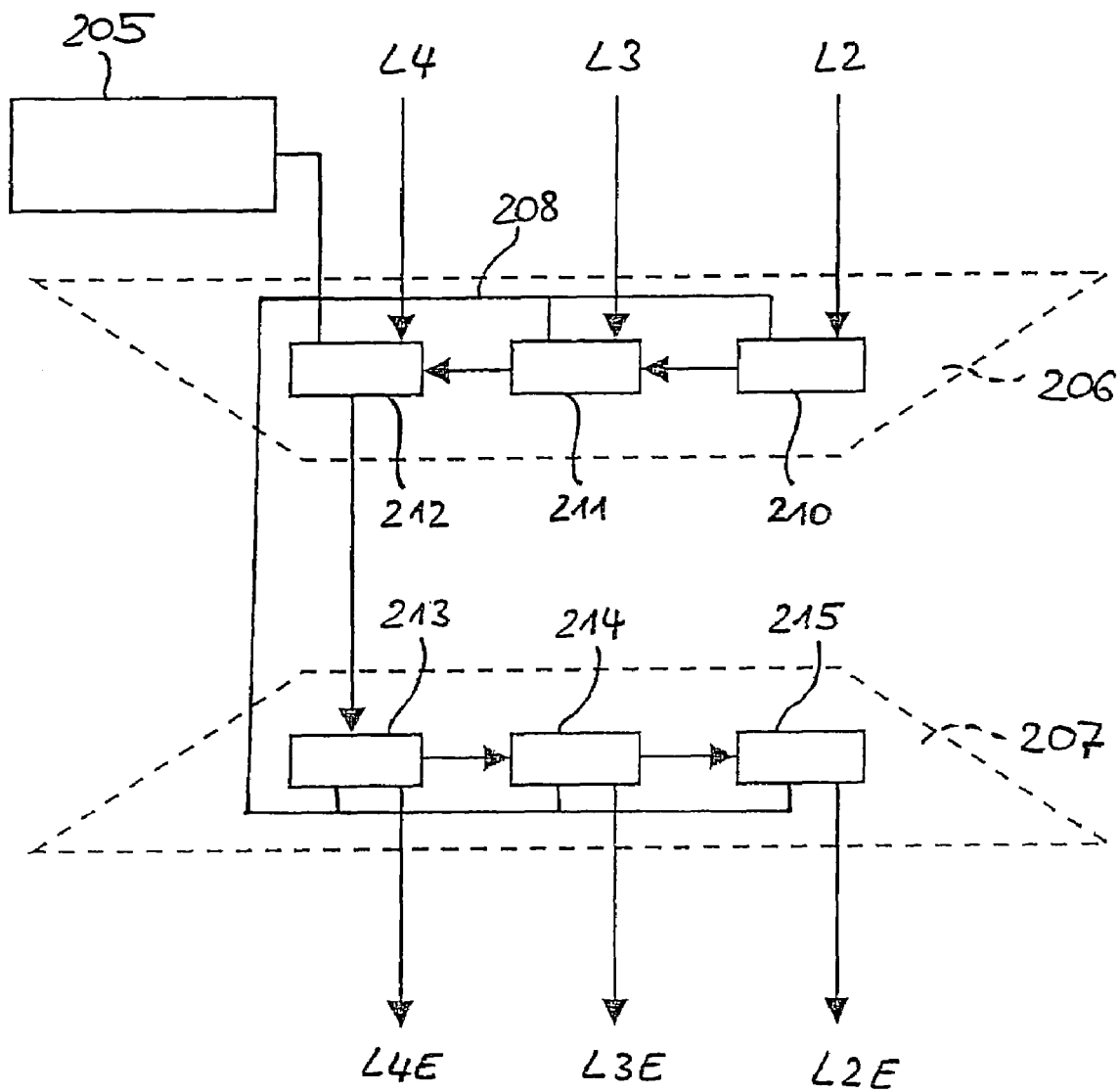
FIG. 3 shows another representation of the relationship between serial transmission through the shift register and the time base.

FIG. 3 shows a symbolically simplified sketch of shift registers 206 and 207 having three register cells 210 through 212 and 213 through 215, respectively. In this context, signal paths L2 through L4 of first station 200 go into register cells 210 through 212, respectively, the transmitted signals then being output from register cells 213 through 215 to the driver modules via signal paths L4E, L3E, and L2E, respectively. Reference numeral 205 again represents the time base or the timer module, which is connected to the register cells and therefore renders possible and generates the automatic frequency for passing on the contents of the register cells. For example, a quartz or a voltage-control oscillator VCO or the like is used as a timer module, which may be implemented by a post-connected counter module or counter so as to even be adjustable with regard to the output clock pulse. Therefore, the signal paths are routed through registers 206 and 207 or corresponding register cells 210 through 215. This direct connection of the timer outputs to the shift register therefore eliminates the need for software interaction and the need to use any capacity, in particular CPU capacity. Therefore, no software triggering occurs, but rather a direct type of triggering from a time base. In this manner, the lower number of connections also produces a smaller disentanglement surface on a corresponding printed circuit board.

Figure 4A:
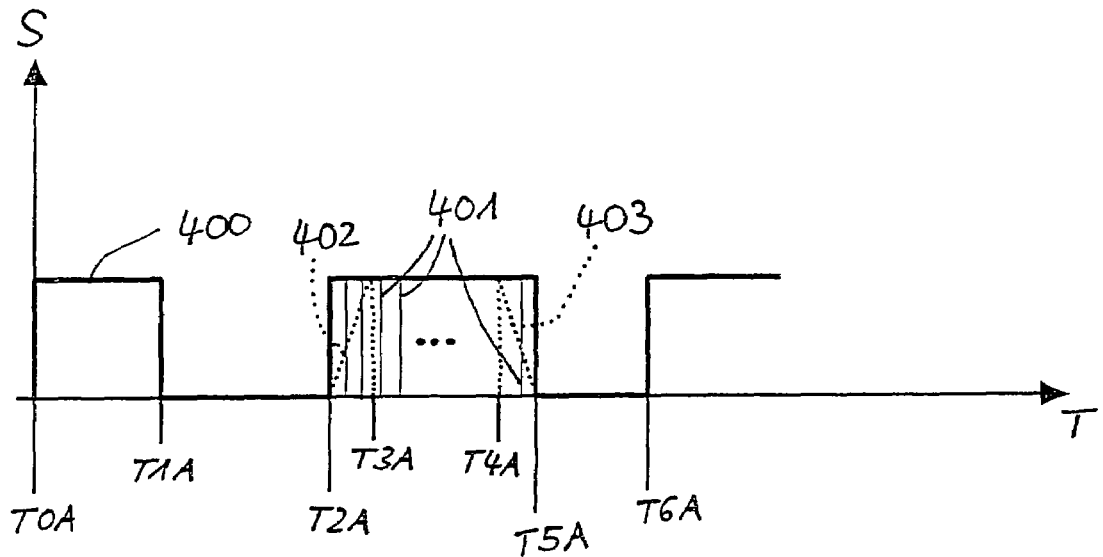
FIGS. 4a and 4b show signal patterns for elucidating the response characteristic.
Figure 4B:
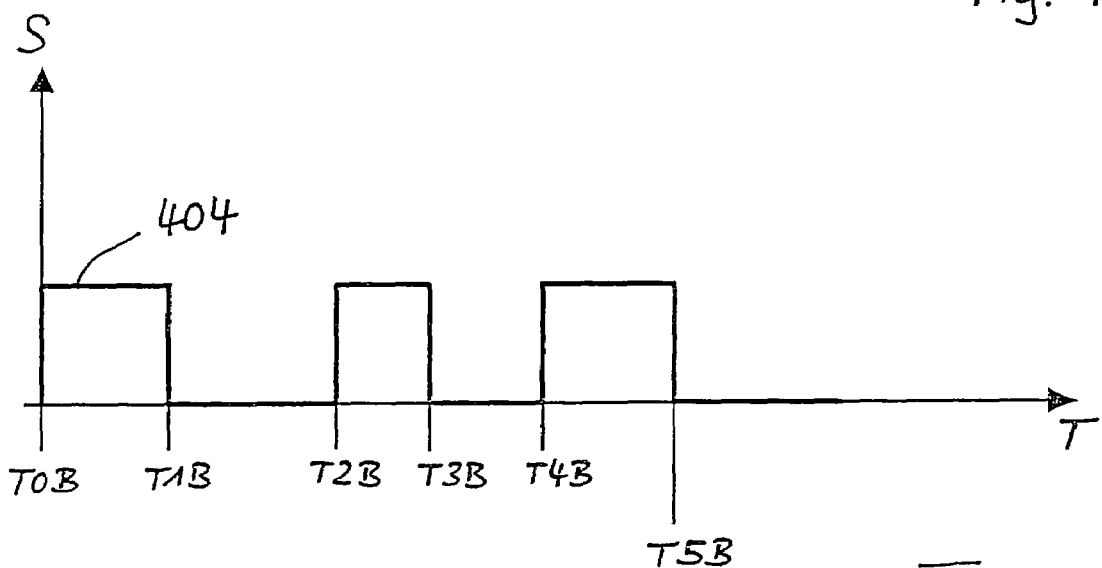

The response characteristic, in particular the advantages resulting from it, shall now be explained once more on the basis of FIGS. 4a and 4b. To this end, patterns 400 and 404 of two signals versus time are represented in FIGS. 4a and 4b. Signal 400 shows a pulse-width modulated signal having fixed time windows of T0A to T2A and T2A to T6A, in which pulse-width modulated signals are transmitted. Thus, a high signal level is produced from T0A to T1A, and a low signal level is produced from T1A to T2A, and a high signal level is produced from T2A to T5A, and a low signal level is produced from T5A to T6A. This signal is applied, for example, to the shift register via signal path L4. The necessary clock-pulse rate is now derived from the width of the time window and the corresponding resolution. If 8-bit resolution is carried out, then one obtains sampling sections which correspond to the time-window width divided by $2^8$, i.e., 256. The automatic clocking or the corresponding clock-pulse rate must be designated in such a manner, that the edge change, e.g. at T2A and T5A, may be reliably detected and transmitted. The resolution is represented by subdivisions 401. If one can still assume that there is an edge 402 or 403, as is shown here between T2A and T3A, as well as between T4A and T5A, then the cycle time must be selected so that the edge may be reliably detected, i.e., the cycle time resulting from the clock-pulse rate is at least equal to or less than the slope time, i.e., T2A to T3A and T4A to T5A.

If it is assumed that, as in FIG. 4b, the time window is variable from T0B to T5B, or the time window has more information content than one edge change or two edge changes, such as in the case of signal 404, then the clock-pulse rate is selected to be considerably higher, exactly 16 bit in 1 μs, as mentioned in the example. This does not change the system performance at the controller pins, since the update rate of the information is 1 μs below the specified slew rate, typically 10 V/μs, for example.

In the examples, signals L1-Lx are synonyms for pads/pins of the microcontroller. In this manner, the usually parallel transmission is converted to serial, without additionally loading the CPU, and using the peripheral modules integrated on the microcontroller.

Since in the case of microcontrollers using new silicon technologies, the chip sizes become smaller and smaller due to smaller structural dimensions, but, on the other hand, the number of implemented functions (that also require output pins) increases, the pad spacing becomes smaller and smaller. Since pad spacings that are too small can no longer be processed using the contacting technology, there are two solutions.

First, it is possible to make the chip larger and consequently arrange all the pads in a suitably processable grid, which, however, results in additional costs that are normally not acceptable. Second, according to the present invention, the number of pins is reduced as described, without decreasing the functionality. The mentioned advantages may be achieved by this use of the present invention.

What is claimed is:

1. A method for serially transmitting data between a first station and a second station, comprising:

transmitting in parallel at least two signals unidirectionally on at least two signal paths, wherein the first station has a first shift register and the second station has a second shift register, each of the first and the second shift registers having at least two register cells corresponding to the at least two signal paths, the at least two signals being routed in parallel on the at least two signal paths into the at least two register cells of the first shift register;

transmitting data corresponding to the at least two signals serially from the first shift register to the second shift register by automatically clocking the register cells of the first shift register and the second shift register from a time base directly connected to the register cells, wherein the first shift register and the second shift register are connected by a serial interface, whereby transmission of the at least two signals occurs in real time, wherein each transmitting is performed without loading a CPU;

wherein the automatic clocking is performed at a clock-pulse rate that is at least twice as high as a signal rate that results from a resolution of a signal having the higher resolution between the at least two signals; and wherein the at least two signals are pulse-width modulated signals.

2. A method for serially transmitting data between a first station and a second station, comprising:

transmitting in parallel at least two signals unidirectionally on at least two signal paths, wherein the first station has a first shift register and the second station has a second shift register, each of the first and the second shift registers having at least two register cells corresponding to the at least two signal paths, the at least two signals being routed in parallel on the at least two signal paths into the at least two register cells of the first shift register;

transmitting data corresponding to the at least two signals serially from the first shift register to the second shift register by automatically clocking the register cells of the first shift register and the second shift register from a time base directly connected to the register cells, wherein the first shift register and the second shift register are connected by a serial interface, whereby transmission of the at least two signals occurs in real time, wherein each transmitting is performed without loading a CPU;

wherein the automatic clocking occurs at a clock-pulse rate, and a cycle time resulting from the clock-pulse rate is one of less than and equal to a slope time of the at least two signals transmitted; and wherein the at least two signals are pulse-width modulated signals.

3. A system for serially transmitting data between a first and a second station, comprising:

a first station having a first shift register with at least two register cells;

a second station having a second shift register with at least two register cells;

a serial interface connecting the first shift register and the second shift register; and a time base directly connected to the register cells of the first and second shift registers;

wherein at least two signals are unidirectionally routed in parallel on at least two signal paths into the at least two register cells of the first shift register, and wherein data corresponding to the at least two signals are serially transmitted from the first shift register to the second shift register by automatically clocking the register cells of the first shift register and the second shift register from the time base, whereby transmission of the at least two signals occurs in real time and are performed without loading a CPU;

wherein the time base is a timer module that automatically generates a time signal at fixed intervals;

wherein the automatic clocking occurs at a clock-pulse rate, and a cycle time resulting from the clock-pulse rate is one of less than and equal to a slope time of the at least two signals transmitted; and wherein the at least two signals are pulse-width modulated signals.

* * * * *